F. LAVIMODIÈRE.
MEASURING INSTRUMENT.
APPLICATION FILED JAN. 27, 1921.
1,434,900.
Patented Nov. 7, 1922.
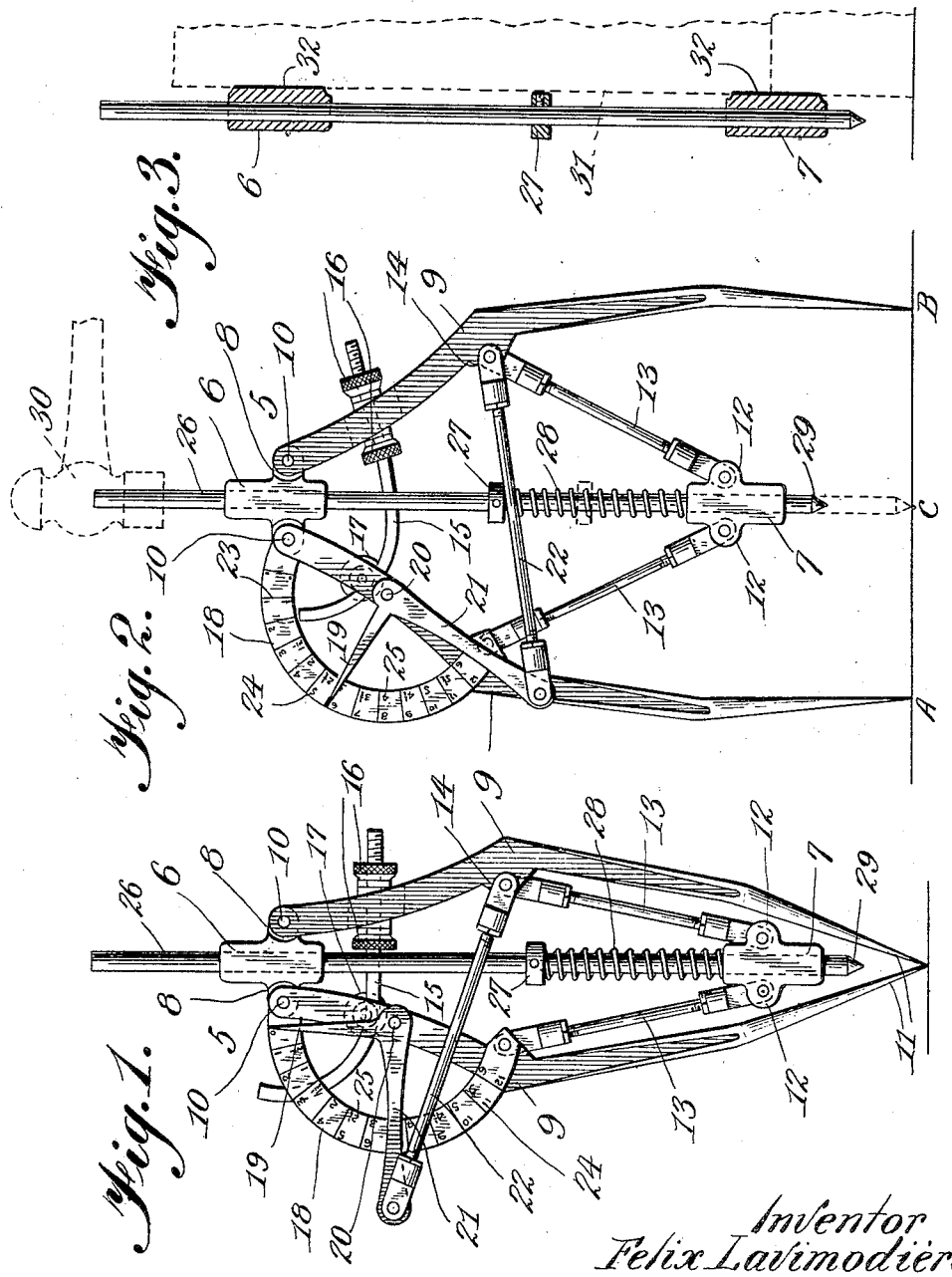
Inventor
Felix Lavimodière
By William Clinton
Attorney Patented Nov. 7, 1922.

1,434,900

UNITED STATES PATENT OFFICE.

FÉLIX LAVIMODIÈRE, OF MONTREAL, QUEBEC, CANADA.

MEASURING INSTRUMENT.

Application filed January 27, 1921. Serial No. 440,476.

*To all whom it may concern:*

Be it known that I, FÉLIX LAVIMODIÈRE, a subject of the King of Great Britain, and residing at Montreal, in the Province of Quebec, Canada, have invented certain new and useful Improvements in Measuring Instruments, and do hereby declare that the following is a full, clear, and exact description of the invention, such as will enable others skilled in the art to which it appertains to make and use the same.

The present invention relates to new and useful improvements in measuring instruments.

The primary object of the invention is the provision of an instrument, for accurately measuring the distance between two given points.

Another object of the invention is the provision of an instrument such as above referred to, to be used preferably in connection with drilling holes in metal between two given points, and marking the point to be drilled.

Still another object of the invention is the provision of an instrument such as above mentioned for measuring the distance between two points, and likewise indicating accurately one half of the distance between the two said points.

A further object of the invention is the provision of an instrument such as above referred to, which is designed particularly for measuring the diameter of circles and also indicating the radius thereof.

A further object of the invention is the provision of an instrument such as above referred to which is provided with a punch, which when set may be driven into the material in which holes are to be drilled, for making an indentation or depression therein, for receiving the point of the drill preparatory to drilling the hole through the material.

A still further object of the invention is the provision of an instrument such as above referred to, which will be comparatively simple and inexpensive to manufacture, reliable and efficient in use, and readily operated.

With the above and other objects in view, the present invention resides in the novel features of construction, formations, combinations, and arrangements of parts, to be hereinafter more fully described, claimed, and illustrated in the accompanying drawing, forming a part of the present invention; and in which, Figure 1 is a side elevation thereof, showing the device in operative position;

Figure 2 is a similar view, showing the device in operative position; and

Figure 3 is a vertical sectional view taken through a portion of the device, showing the method of aligning the several points thereof.

Referring now to the accompanying drawings, by corresponding characters of reference throughout the several views, the numeral 5 designates in general my improved measuring instrument, which comprises a pair of upper and lower blocks 6 and 7, the former of which is provided, at its opposite sides with outwardly extending ears 8, to which the upper end of the legs 9 are pivotally connected as shown at 10.

These legs 9 are extended outwardly intermediate their ends in order that the actuating mechanism may be positioned therebetween, and the points 11 of the said levers, brought together.

Ears 12 are formed on the opposite side of the lower block 7 and have pivotally connected thereto, the lower ends of a pair of links 13, which are in turn pivotally connected to the upper ends of the ears 14, formed on the inner edges of the legs 9, intermediate the ends thereof.

As clearly shown in the drawings, the links 13 are adjustable.

A curved locking rod 15 is adjustably connected by the inner and outer milled nuts 16, to one of the legs 9, and passes through a slot formed in the other of the legs.

A set screw 17 locks the member 15, and the legs 9 in their relative adjusted position.

A curved gauge 18 of a substantially semicircular formation is secured to the upper end of one of the legs 9, and cooperating therewith, is a pointer 19, pivoted as at 20 to the said leg 9, to which the gauge 18 is attached.

An arm 21 extends from the inner end of the pointer 19 and is connected by means of a link 22, which is adjustable in a similar manner to the links 13, to the opposite leg 9 as clearly shown in Figures 1 and 2.

Obviously upon the spreading of the leg 9 relative to each other, the pointer will be moved over the gauge 18 and as the adjacent side thereof is graduated as at 23, corresponding to the difference between the points 11, all that it is necessary to do, to ascertain the distance between two points, is to place the points 11 at the desired points on an article, to be gauged, and the distance between the points will be indicated by the outer numbers 24, on the gauge 18, while the inner numbers 25 which are marked on said gauge, will give accurately one half the distance, between the said points.

A punch is shown at 26, and is slidably mounted in aligning openings provided in the blocks 6 and 7.

A collar 27 is secured to the said punch, and engages the upper end of a coil spring 28, the lower end of which rests upon the upper end of the block 6 and serves to normally hold the punch in raised position, shown by the full lines of Figure 2.

The punch however, can be forced downwardly, against the tension of the spring 28, until its sharpened terminal 29 can be projected to the same plane or beyond the plane in which the points 11 are positioned.

The operation of the device is as follows:

When it is desired to drill a hole in a piece of material between two points. A and B shown in Figure 2 the points 11 are placed on the points A and B and the upper end of the punch is struck by a hammer or other suitable device 30, which drives the punch to the dotted line position of Figure 2, marking the place to be drilled at the point C.

In the same manner the device may be used for particularly ascertaining the diameter of circles, or the radiuses thereof.

In order that the point C may be positioned in the same line as the points A and B, a square shown at 31 may be placed on the material to be drilled, and as the rear side of the blocks 6 and 7 are provided with flat surfaces 32 the alignment of the points A and B and C will thus be assured.

From the foregoing description taken in connection with the accompanying drawings, it will be manifest that an instrument for measuring the distances, and for ascertaining a central point between two given points, is provided which will fulfil all of the necessary requirements of such a device, and it should be understood in this connection, that various minor changes in the specific details of constructions, can be resorted to within the scope of the appended claim, without departing from the spirit or sacrificing any of the advantages of the invention.

Having thus fully described my invention, what I claim as new and desire to secure by Letters Patent is:

The combination in an instrument such as described, of a pair of blocks, said blocks having aligning openings therein, a punch slidably mounted in said openings, means for yieldingly holding the punch in raised position, a pair of legs attached to one of said blocks, an operative connection between the legs and the other of the blocks, a scale carried by one of said legs, a pointer carried by the legs, and movable over the scale, a link connecting said pointer with the other of the legs, means for locking the legs in their adjusted positions and the said blocks having their sides disposed in the same vertical plane when the instrument is in operative position whereby a square may be engaged therewith.

In witness whereof I have hereunto set my hand.

FÉLIX LAVIMODIÈRE.

Witnesses:
C. A. LAVIMODIÈRE,
J. O. FOSBROOKE.